(12) United States Patent  
Siegfriedsen

(10) Patent No.: US 8,704,391 B2  
(45) Date of Patent: Apr. 22, 2014

(54) METHOD OF PARKING DOUBLE-BLADED ROTOR OF WIND POWER PLANT

(75) Inventor: Soenke Siegfriedsen, Rendsburg (DE)

(73) Assignee: Aerodyn Engineering GmbH, Rendsburg (DE)

( * ) Notice: Subject to any disclaimer, the term of this patent is extended or adjusted under 35 U.S.C. 154(b) by 123 days.

(21) Appl. No.: 13/132,520

(22) PCT Filed: Dec. 3, 2009

(86) PCT No.: PCT/DE2009/001727  
§ 371 (c)(1), (2), (4) Date: Jun. 2, 2011

(87) PCT Pub. No.: WO2010/075833  
PCT Pub. Date: Jul. 8, 2010

(65) Prior Publication Data  
US 2011/0248501 A1   Oct. 13, 2011

(30) Foreign Application Priority Data  
Jan. 2, 2009   (DE) .......................... 10 2009 004 070

(51) Int. Cl.  
*F03D 7/00*   (2006.01)

(52) U.S. Cl.  
USPC ................................ 290/44; 290/55

(58) Field of Classification Search  
USPC ....................................... 290/44, 55  
See application file for complete search history.

(56) References Cited

U.S. PATENT DOCUMENTS

| | | | | |
|---|---|---|---|---|
| 4,561,826 A * | 12/1985 | Taylor | ............................. | 416/19 |
| 5,746,576 A * | 5/1998 | Bayly | .............................. | 416/16 |
| 6,441,507 B1 * | 8/2002 | Deering et al. | .................. | 290/44 |
| 6,870,281 B2 * | 3/2005 | Weitkamp | ........................ | 290/55 |
| 7,393,180 B2 | 7/2008 | Von Mutius | | |
| 8,100,628 B2 * | 1/2012 | Frese et al. | ...................... | 415/4.3 |
| 2002/0067274 A1 * | 6/2002 | Haller | ........................... | 340/601 |
| 2010/0194114 A1 | 8/2010 | Pechlivanoglou et al. | | |

FOREIGN PATENT DOCUMENTS

| | | |
|---|---|---|
| DE | 10141098 | 3/2003 |
| EP | 0709571 | 5/1996 |

* cited by examiner

*Primary Examiner* — Tho D Ta  
(74) *Attorney, Agent, or Firm* — Diederiks & Whitelaw, PLC

(57) ABSTRACT

A method for moving a double-bladed rotor of a wind power plant into a parking position characterized by the orientation of the rotor blades in a horizontal plane and braking the rotor.

12 Claims, 8 Drawing Sheets a.

b.

METHOD OF PARKING DOUBLE-BLADED ROTOR OF WIND POWER PLANT

CROSS-REFERENCE TO RELATED APPLICATIONS

This application represents a National Stage application of PCT/DE2009/001727 entitled "Wind Power Plant" filed Dec. 3, 2009, pending.

BACKGROUND OF THE INVENTION

1. Field of the Invention

The invention relates to a method for moving a double-bladed rotor of a wind power plant into a parking position.

2. Discussion of the Prior Art

Transferring wind power plants from an operating position into a parking position is always necessary when climatic conditions, in particular high wind loads, occur, that may damage the wind power plants on account of the immense forces that partly act only briefly on the wind power plants. Thus wind power plants are vulnerable in particular in regions with a high occurrence rate of extreme winds, in particular seasonally occurring winds and whirlwinds such as hurricanes or typhoons that also exhibit a high degree of turbulence.

In particular three-bladed rotors are affected especially by cross flows due to the geometric arrangement of the blades, that could lead to extremely high loads and finally to the destruction of the plant. To dimension the wind power plant components such that they can withstand these forces seems impossible for these cases.

So that wind power plants can be installed even in these regions and their potential to extract energy can be used, several mechanisms have already been developed for protecting the wind power plants from damage by the storms that have been mentioned.

EP 0 709 571 A2 thus introduces a wind power plant with a double-bladed rotor that has rotor blades with rotor blade sections that can be rotated freely relative to each other, so that on the one hand the entire rotor can be oriented parallel to the wind direction or in the case of a frontal flow at least the load acting on the rotor can be reduced.

A disadvantage of this design is however the very complex blade structure that is complicated and is likewise susceptible for high wind loads.

In contrast, DE 101 41 098 A1 totally dispenses with braking and locking the rotor. There the rotor is to be stabilized without braking and without locking in a rotating position by preventing the rotor from leaving the parking position on account of turbulences by adjusting the rotor blades into a position that counteracts the rotational movement. The control is to effect an "idling" of the rotor in this way without leaving the parking position.

However, it seems doubtful that the control introduced in DE 101 41 098 A1 without further details can react with such a speed to turbulences that the wind power plant having this type of control can avoid damage by high wind loads. Rather it has to be expected that the components of the wind power plant that move while high wind loads occur generate further variable moments that would have to be taken into account when designing and dimensioning the components. The construction of such wind power plants can however hardly be calculated because the parameters cannot be predetermined.

SUMMARY OF THE INVENTION

The object of the invention is therefore to reduce the loads occurring in a wind power plant with a braked and locked rotor such that they can sufficiently withstand also turbulent flows.

In this context, it also has to be taken into account that the electricity network is switched off during the conditions of extreme weather that have been previously mentioned and that the wind power plants depend on passive mechanisms that have to make do without an additional energy supply.

The basic idea of the invention is to bring the double-bladed rotor of a wind power plant by braking into a parking position in which the rotor blades are oriented horizontally. The rotor is preferably locked positively by means of locking means, the locking means being designed particularly preferably as hydraulically driven locking bolts that engage into locking recesses. Particularly preferred, the blades are also oriented relative to each other in terms of their pitch angle to the longitudinal axis that considering the inclination of the rotor axis and the aerodynamic properties of the blades on the rotor axis a minimal torque and if possible minimal loads that act on the blade roots occur. Averaged over time, preferably only the dead-weight moments are to be present at the blade flanges as load average.

Most particularly preferred, the blades are to be oriented to each other relative to the longitudinal axis in terms of their pitch angle such that blade uplift forces are generated that (averaged over time) compensate the dead-weight force of the blades. These uplift forces are preferably also to counter-act the pitching moment that is generated by the inclination of the rotor axis.

In particular a control system is provided that controls the braking force of the rotor brake by means of a pressure-regulating valve such that the rotational speed of the rotor is braked as a result of the angle and/or position detection of the rotor in such a way that the rotor comes to a standstill in the horizontal parking position. Then a checking device is being used that checks the precision of the position that has been assumed. In a position in which the locking means cannot engage in their recesses with which they co-operate the control system again releases the rotor, after which the rotor can again rotate and a new braking and checking procedure is being triggered. If however the position that has been assumed coincides with the predetermined tolerances, preferably locking bolts are inserted into the locking recesses that fix the rotor in its horizontal position by means of a positive engagement.

According to the invention, the rotor of the double-bladed-rotor wind power plant is moved into a horizontal parking position by a regulated target-braking, braked and locked preferably by inserting hydraulically operated bolts into recesses provided on the rotor for this purpose. Then the rotor blades are brought into a position that is a function of the inclination of the rotor axis of the wind power plant and the aerodynamic properties of the blade for an inflow from below and from above and in which they preferably rest permanently. It is also the case that the blade angles of the two blades differ on account of their usually asymmetric construction relative to the chord of the blade.

If the wind power plant is designed as a downwind machine and braked in the horizontal position, and the yaw brake(s) released and the yaw motors decoupled, i.e. the output toothing of the yaw motor no longer engages the toothing ring gear arranged on the tower, to avoid excess revolutions, independent tracking of the rotor can take place when the wind direction changes. This ensures that the blades do not have a cross flow and only small uplift forces can develop. The advantage of the inventive plant is that moving parts to regulate the parking position and thus plants required during the parking position to generate auxiliary energy can be dispensed with. Compared to conventional plants, the wind power plant according to the invention is at the same time subject to less wear and also has a higher degree of stability and safety in comparison to those.

BRIEF DESCRIPTION OF THE DRAWINGS

The invention is therefore explained by way of a specific example using a particularly preferred exemplary embodiment shown in the drawings. In the Figures:

FIG. 5a shows a perspective view of a wind power plant according to the invention with the rotor braked and locked in the parking position, to illustrate the geometric conditions and axes;

FIG. 5b shows a frontal view of the wind power plant of FIG. 5a;

DETAILED DESCRIPTION OF THE INVENTION

Figure 1:
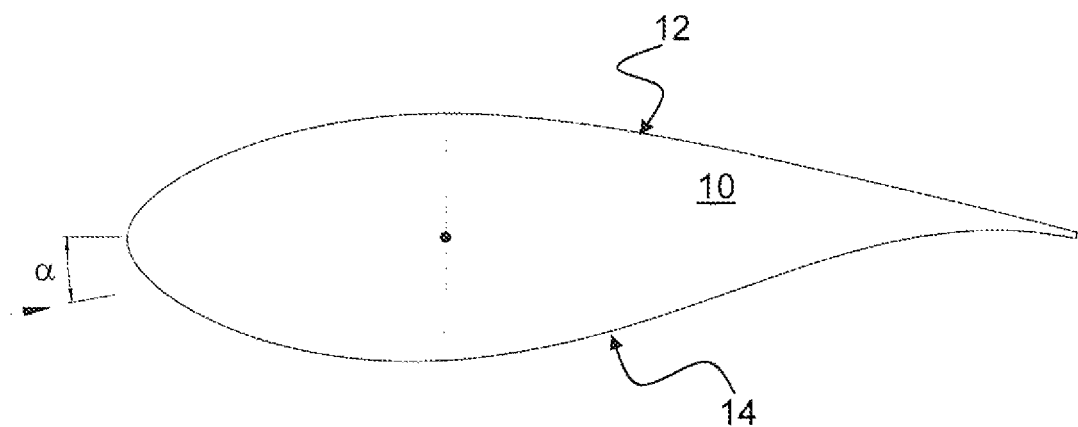
FIG. 1 shows a sectional drawing of an aerodynamic profile of a rotor blade of a wind power plant.

FIG. 1 shows a diagrammatic sectional view of an aerodynamic profile 10. The rotor-blade profile 10 is of asymmetric design relative to its chord—it can be seen clearly that the top side 12 of the profile 10 is shaped differently than its bottom side 14. Here, the angle α designates the angle between the inflow and the chord, the chord being the straight connecting line between the leading edge and the trailing edge of the profile.

Figure 2:
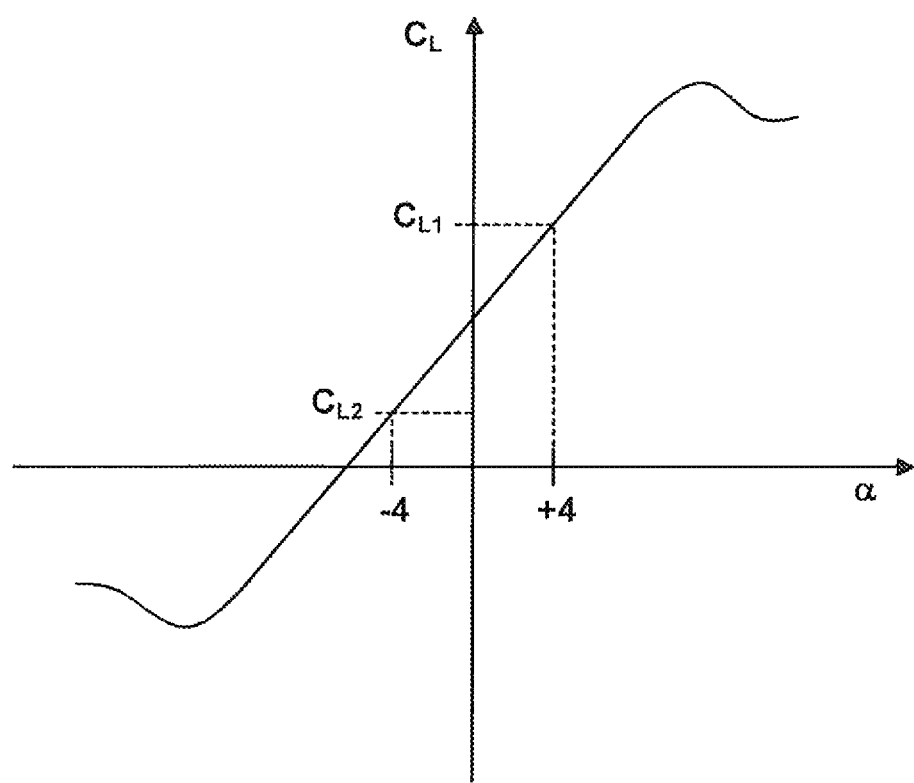
FIG. 2 shows a diagram that illustrates the uplift coefficients (CO against the angle of attack of a profile.

FIG. 2 shows that in the case of asymmetrically shaped profiles a different inflow angle α leads to different profile uplift coefficients $C_L$. In the example shown, an angle α of −4° for example leads to an uplift force that is lower by more than one half than an inflow angle α of +4°.

Figure 3:
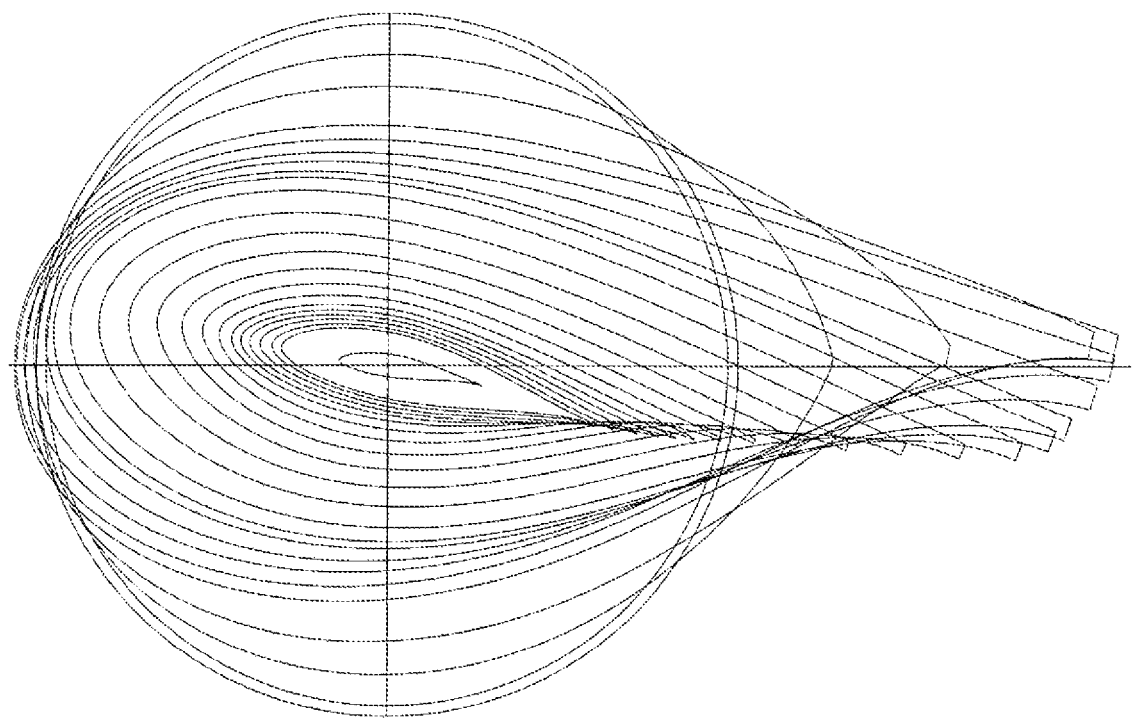
FIG. 3 shows a diagrammatic representation, cut in different levels of the blade, of a rotor blade.

FIG. 3 shows diagrammatically the different profiles that form along the axis of a rotor blade, the profiles at the blade tip having a thinner design than at the blade root and the profiles being warped relative to each other.

Figure 4:
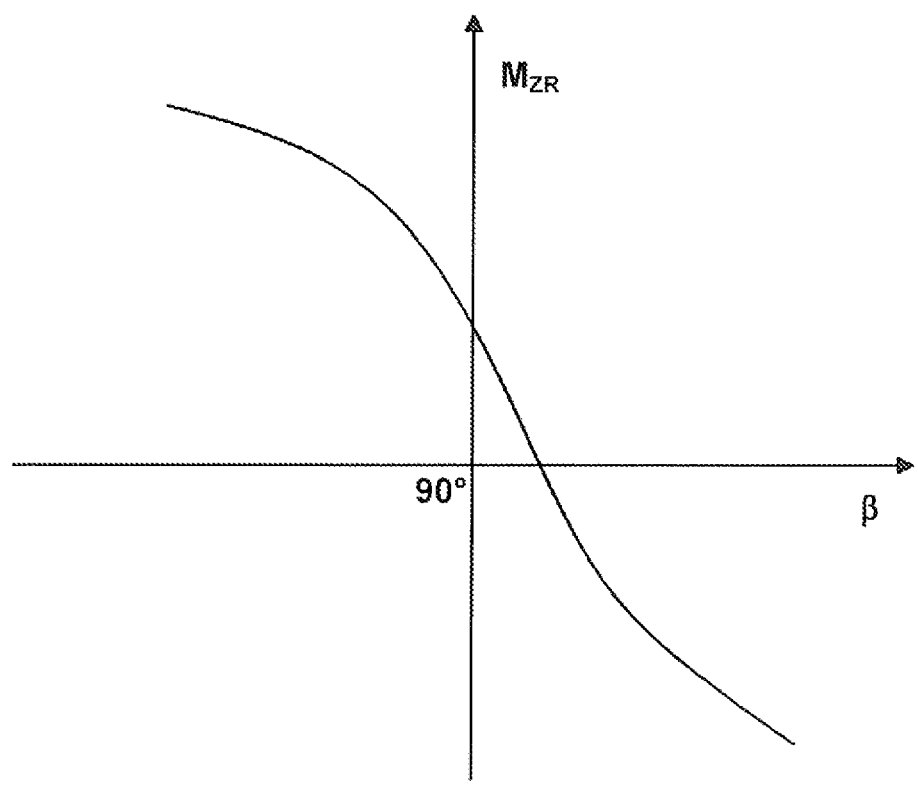
FIG. 4 shows a second diagram to illustrate the torque acting on the rotor axis of a rotor blade as a function of the blade pitch angle.

FIG. 4 shows a second diagram to illustrate the torque $M_{ZR}$ acting on the rotor axis as a function of the blade pitch angle β, that is to say the angle between the optimum production position and the rotor plane (that is defined as 0°) in the case of a constant inflow.

Figures 5A, 5B:
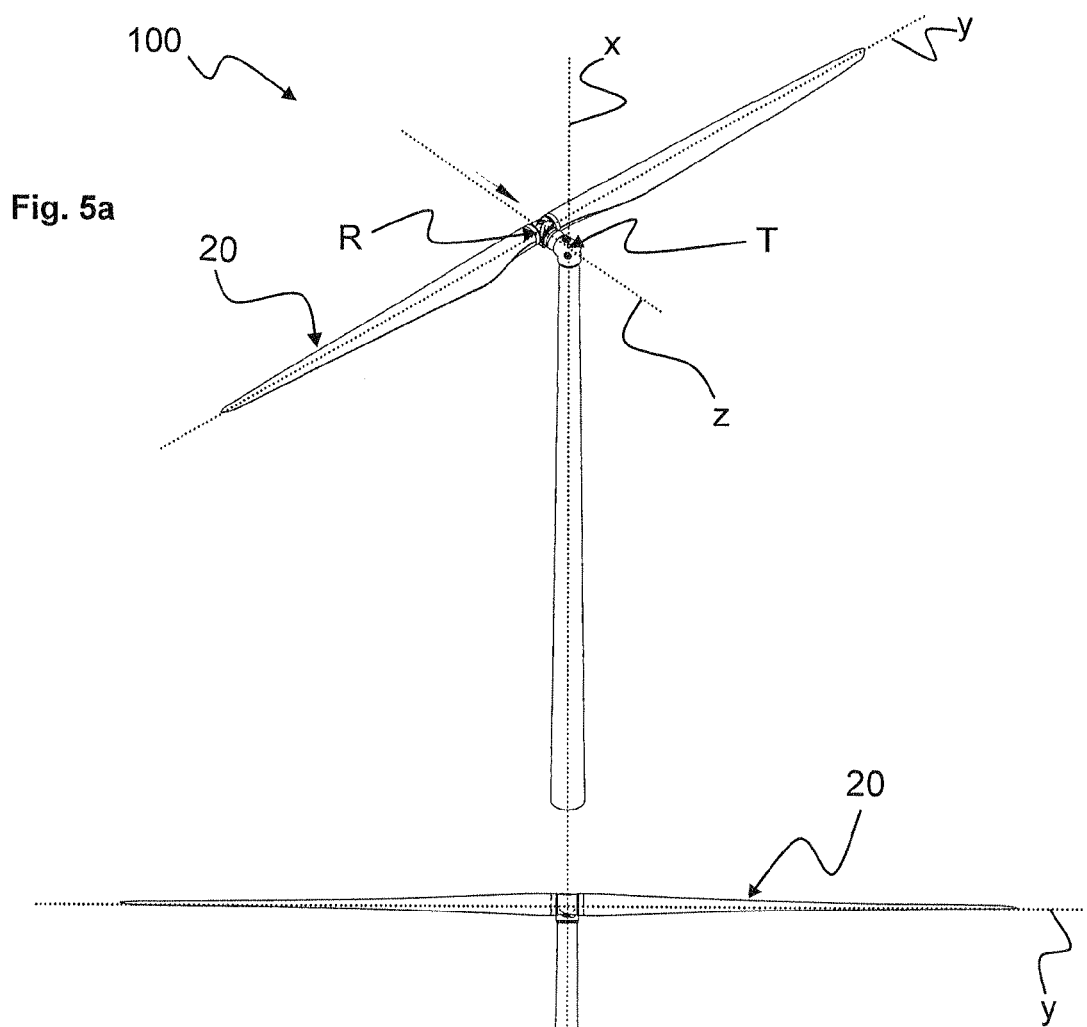

FIGS. 5a and 5b show a wind power plant according to the invention with the rotor braked and locked in the inventive parking position. The wind power plant 100 is equipped with a double-bladed rotor 20. It can be seen clearly that the rotor 20 has been brought into a horizontal position.

To better understand the description, the wind power plant 100 is drawn in a coordinate system with x, y and z axes. The R point designates the intersection of y and z axes, and the T point designates the intersection of the x and z axes.

FIG. 5b shows the wind power plant from FIG. 5a in a front view, the blade position, as described below relative to FIG. 7, of the left rotor blade 30 and the right rotor blade 40 differing from each other.

Figure 6A:
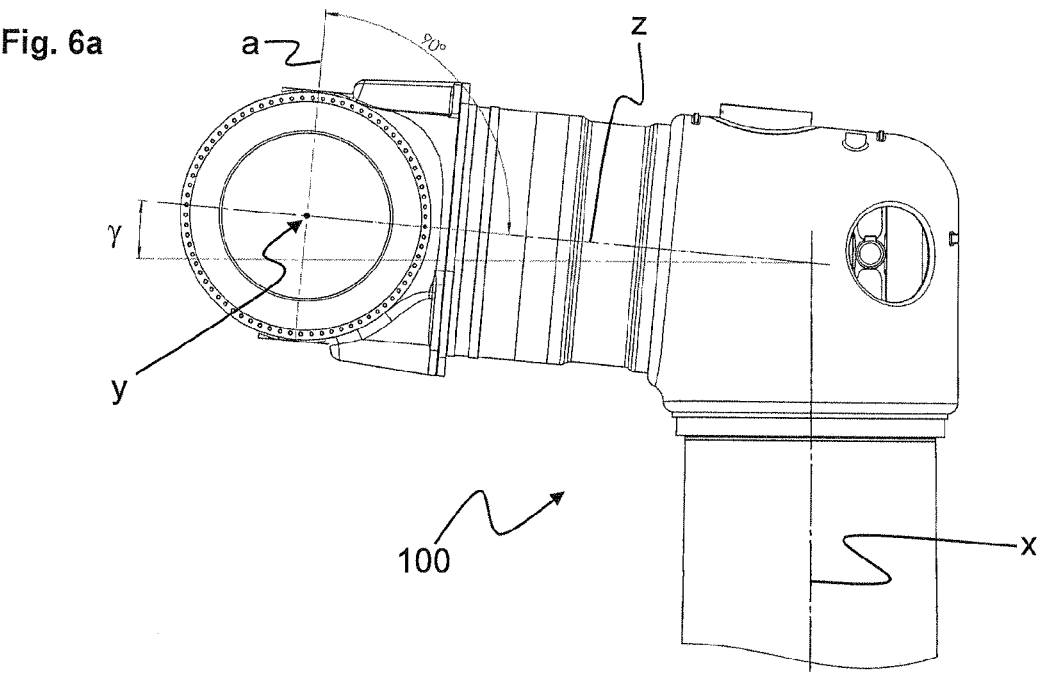
FIG. 6a shows an elevation of a wind power plant having a double-bladed rotor.

The diagrammatic elevation shown in FIG. 6 of the wind power plant 100 from FIG. 5 clarifies the blade-angle position of the left rotor blade 30 and the right rotor blade 40 for conventionally operated plants. Here, z designates the rotor axis, the angle γ the inclination of the rotor axis relative to the horizontal, and p the blade angle relative to the rotor plane a that stands vertically on the rotor axis.

Figure 6B:
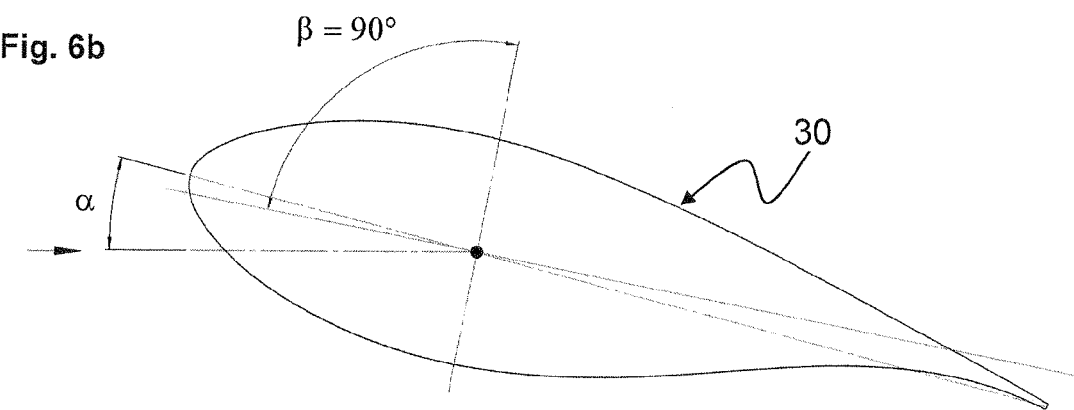
FIG. 6b shows a profile section of the one blade of the wind power plant at approximately half the blade length.
Figure 6C:
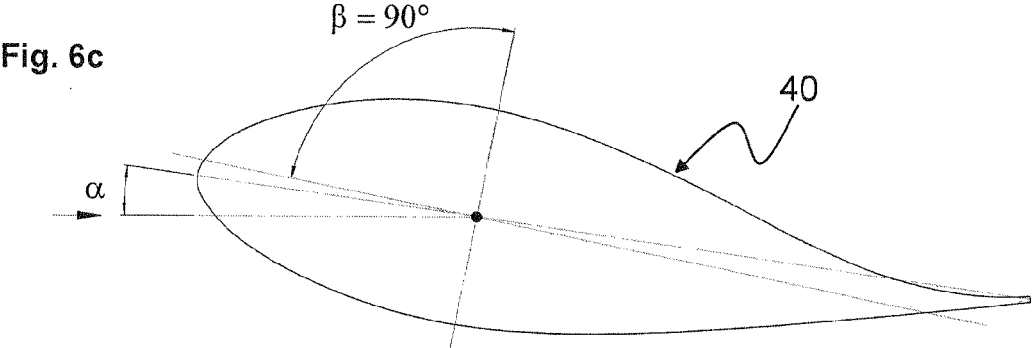
FIG. 6c shows a profile section of the other blade of the wind power plant at approximately half the blade length.

FIG. 6b shows a section through the left blade 30 for a pitch angle of β=90°. FIG. 6c shows a section through the right blade 40 for a pitch angle of likewise β=90°. It can be recognized here that differing uplift coefficients will result for an inflow from the left side in the drawing plane, which again leads to a torque loading of the shaft.

Figure 7A:
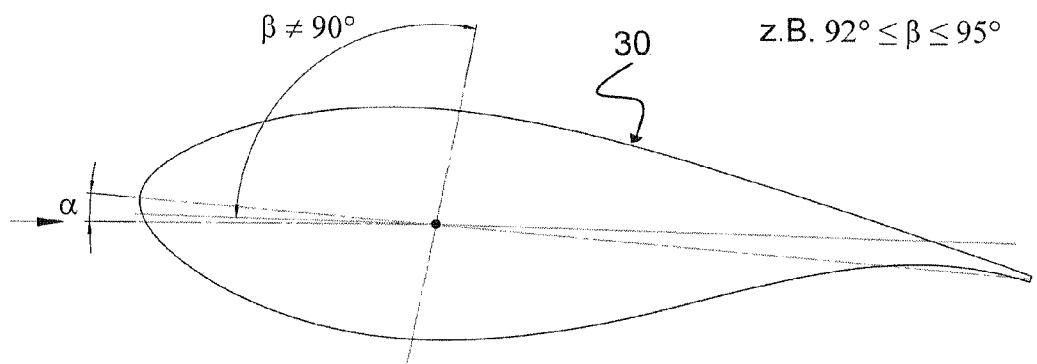
FIG. 7a shows the position of the one blade of the wind power plant from FIG. 6b when using the inventive method.
Figure 7B:
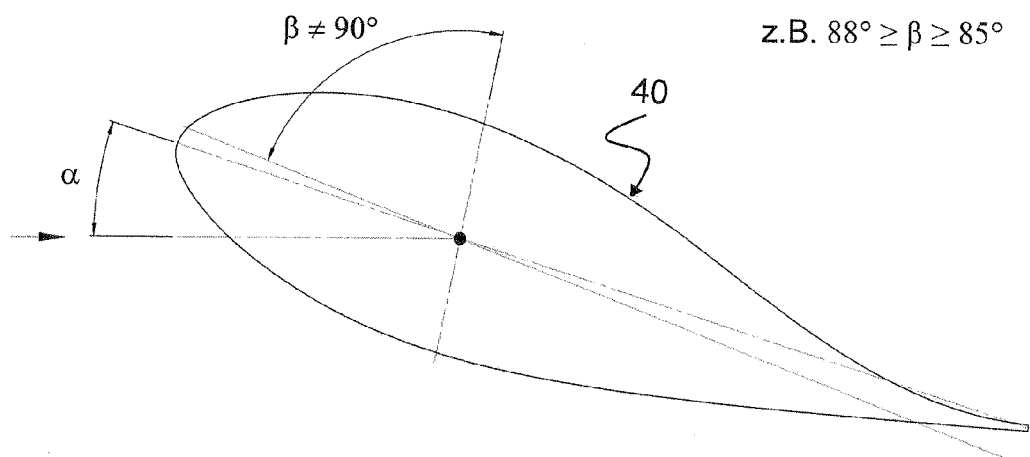
FIG. 7b shows the position of the other blade of the wind power plant from FIG. 6 when using the inventive method.

FIG. 7 now shows the adjustment of the two rotor blades when using the inventive method. The two blades 30 and 40 are positioned relative to each other such that the rotor axis has a minimum torque and the rotor-blade flanges have a minimum loading by the rotor blades. Therefore the blade pitch angle for the blade 30 shown in FIG. 7a thus for example amounts to between 92° and 95°, at the same time the blade pitch angle for the other blade 40 from FIG. 7b amounting to between 88° and 85°.

The differing inflow angles resulting from the different blade pitch angles thus lead to an adaptation of the uplift coefficients and thus to a reduction in the rotor torque.

Figure 8:
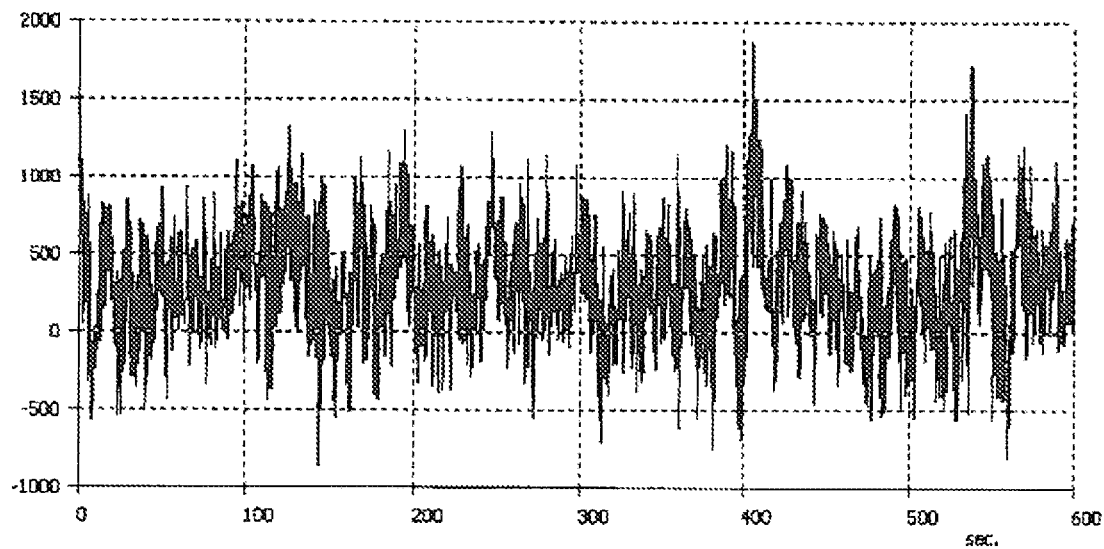
FIG. 8a shows a diagram that shows over time the loading of the rotor axis with the torque $M_{ZR}$ for a double-bladed rotor of a conventional wind power plant.
FIG. 8b shows a diagram that illustrates over time the loading of the rotor axis of a double-bladed rotor with the torque $M_{ZR}$ when using the inventive method.
Figure 8:
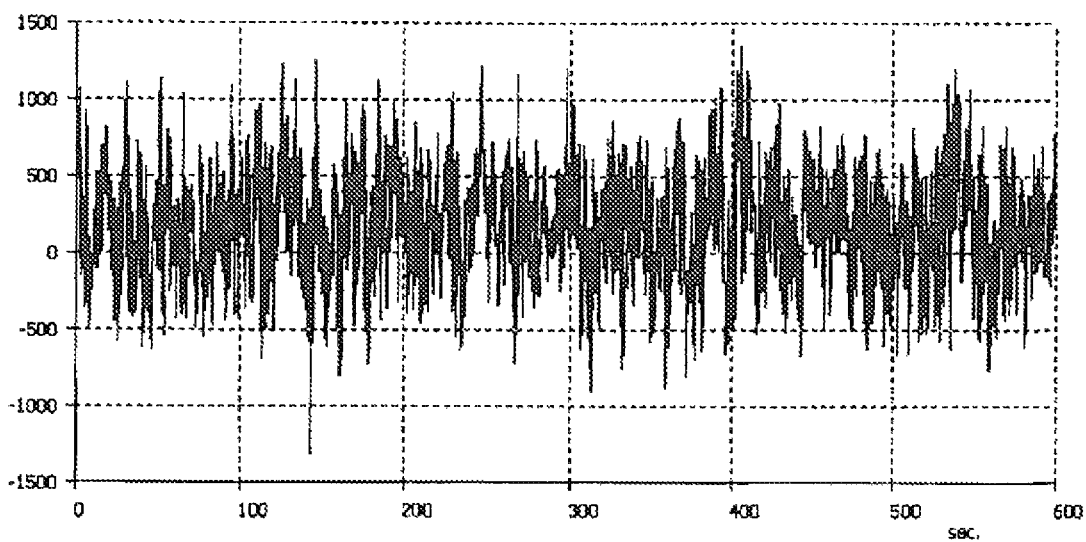

FIG. 8 finally shows clearly the load distribution on the rotor axis that has been improved by the inventive method, using charts that represent the loading of the rotor axis (the torque $M_{ZR}$) of a double-bladed rotor against the time.

FIG. 8a shows that over time peak loads can occur in a conventionally operated double-bladed rotor with β=90° for both blades that can lead to the wind power plant being damaged.

In contrast, it can be seen in FIG. 8b that both the average loading and the peak loads can be reduced by the inventive control of the blade angles of both rotor blades (in the example shown, β=95° for the one blade and β=85° for the other blade). This leads to the components of the plant being protected against damage.

The invention claimed is:

1. A method for moving a double-bladed rotor of a wind power plant into a parking position, comprising:
   braking the rotor to cause both first and second blades of the double-bladed rotor to be oriented in a common horizontal plane;
   maintaining the first and second rotor blades of the rotor in the common horizontal plane to establish the parking position;
   adjusting a first angle of attack for a first one of the rotor blades for adjusting an aerodynamic first force acting on the first blade in the parking position; and adjusting a second angle of attack for a second one of the rotor blades for adjusting an aerodynamic second force acting on the second blade in the parking position, wherein torques resulting from the first and second forces on an axis of the rotor, averaged over time, compensate each other and blade uplift forces are produced that compensate dead-weight forces of the blades averaged over time in the parking position.

2. The method according to claim 1, characterized in that the rotor blades are moved accurately into the horizontal parking position by a regulated braking of the rotor.

3. The method according to claim 1, characterized in that the rotor is locked positively with locking means when the rotor blades are oriented horizontally.

4. The method according to claim 1, characterized in that blade uplift forces are produced that counteract a pitching moment produced about a horizontal axis on account of the dead weight of the blades.

5. The method according to claim 1, characterized in that the wind power plant is a downwind machine.

6. The method according to claim 1, characterized in that a pitch angle of one of the rotor blades relative to a rotor plane and a pitch angle of another one of the rotor blades relative to the rotor plane are different.

7. The method according to claim 6, characterized in that the pitch angle of the one rotor blade and the pitch angle of another rotor blade are selected as a function of inclination of an axis of the rotor and aerodynamic properties of the rotor blades.

8. The method according to claim 6, characterized in that blade uplift forces are produced that counteract a pitching moment produced about a vertical axis on account of the dead weight of the blades.

9. In a wind power plant including a rotor defining a rotor axis and supporting first and second rotor blades defining first and second blade axes, a method for moving the rotor into a parking position comprising:
orientating the first and second rotor blades of the rotor such that both of the first and second blade axes are arranged in a common horizontal plane;
braking the rotor to establish the parking position in which the first and second rotor blades are maintained in the common horizontal plane;
adjusting a first angle of attack for the first rotor blade for adjusting an aerodynamic first force acting on the first blade in the parking position; and
adjusting a second angle of attack for the second rotor blade for adjusting an aerodynamic second force acting on the second blade in the parking position, wherein torques resulting from the first and second forces on the rotor axis, averaged over time, compensate each other and blade uplift forces are produced that compensate dead-weight forces of the blades averaged over time in the parking position.

10. The method according to claim 9, wherein the wind power plant is a downwind machine.

11. The method according to claim 9, characterized in that a pitch angle of the first rotor blade relative to a rotor plane and a pitch angle of the second rotor blade relative to the rotor plane are different.

12. The method according to claim 11, wherein the pitch angle of the first rotor blade and the pitch angle of the second rotor blade are selected as a function of inclination of the rotor axis and aerodynamic properties of the rotor blades.

* * * * *